INVENTOR.
EARL PATTERSON, JR
BY
Wayne B. Easton
ATTORNEY

United States Patent Office 3,383,931
Patented May 21, 1968

3,383,931
DRIVE MECHANISM
Earl Patterson, Jr., Excelsior, Minn., assignor to Char-Lynn Company, Eden Prairie, Minn., a corporation of Minnesota
Filed Sept. 16, 1966, Ser. No. 580,116
4 Claims. (Cl. 74—63)

This invention relates to a drive mechanism for transmitting torque between a first member, which is rotatable about its own axis, and a second member which is eccentrically disposed relative to said first member and which is capable of orbital movement relative to said first member and which may or may not also be capable of rotational movement relative to said first member.

There are various forms of drive mechanisms in the prior art referred to above for transmitting torque between two relatively orbitably moveable members. In general such drive mechanisms are embodied in devices which usually comprise a first member which is rotatable about its own axis and a second member which is orbitable and rotatable relative to the axis of the first member. A common form of such drive mechanisms comprise an arrangement of pins and holes which is effective to facilitate the rotation of the first and second members in the same direction, and at the same speed of rotation, while cancelling the orbital movement of the second member. In one particular form of such prior art drive mechanisms a plurality of circumferentially arranged holes are provided in one of the members and a circumferentially arranged plurality of rollers or pins for disposition in the holes are fixedly attached to the other of the members. This prior art drive has two characteristics which are (1) that a separate plate member to which the roller members are attached must be provided and (2) some form of sliding friction is present.

In one embodiment of the drive mechanism of the present invention means are provided for transmitting torque between two relatively orbitably moveable members which comprises a number of circumferentially arranged holes formed in the other member, there being a like number of rollers respectively disposed in the holes for transmitting torque between the two members.

Four advantages of the present invention over prior art drive mechanisms are (1) the need for a separate plate or the like for carrying rollers attached thereto is eliminated, (2) the space requirements for the separate plate or the like in an axial direction is eliminated, (3) only a rolling engagement is present between the rollers and the two drive members, and (4) each of the rollers is at all times in engagement with both of the drive members.

A main object of the invention is to provide a new and improved drive mechanism as described herein.

Other objects and advantages of the invention will become apparent from the following specification, drawings and appended claims.

Figure 1:
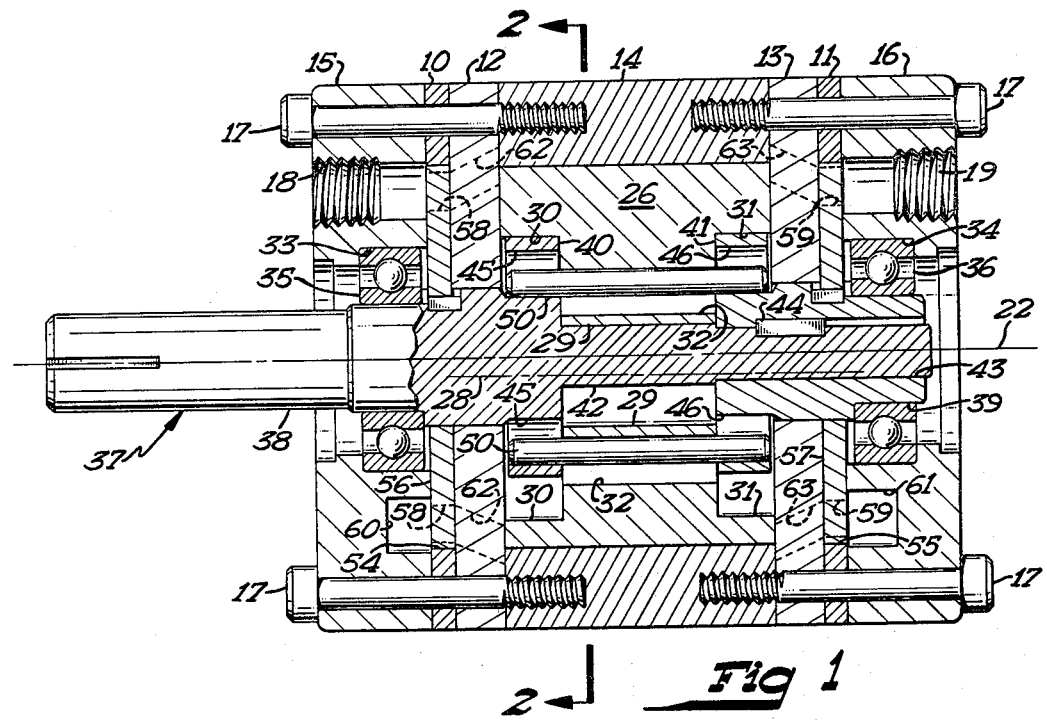

In the drawings:
FIG. 1 is a longitudinal sectional view of a fluid pressure device in which a drive mechanism in accordance with the present invention is embodied; and
FIG. 2 is a sectional view taken on line 2—2 of FIG. 1.

The drive mechanism of the present invention has general utility and it is only by way of example that it is illustarted herein as being embodied in a fluid pressure device which may be utilized as a pump or a motor.

Figure 2:
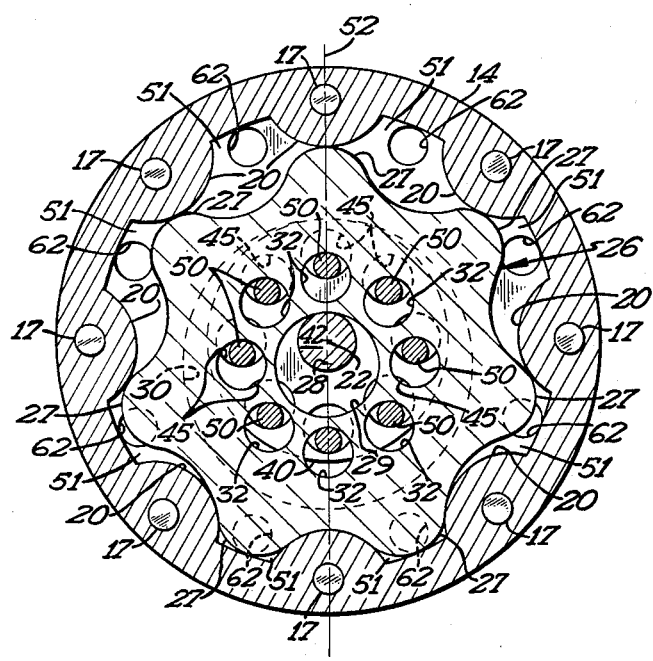

In the fluid pressure motor or pump illustrated in FIGS. 1 and 2, there is provided a casing or housing made of several sections which are two annularly shaped valve casing sections 10 and 11, two annularly shaped fluid passage casing sections 12 and 13, a gerotor casing section 14, and two annularly shaped end sections 15 and 16.

Casing sections 10 to 16 are held together in axial and radial alignment by two sets of circumferentially spaced bolts 17 and the external surface of the casing of the device formed by the casing sections has a cylindrical shape. Casing end sections 15 and 16 are provided with axially extending inlet and outlet ports 18 and 19 which could be reversed for operation of the pump or motor in the opposite direction.

Referring to FIG. 2, gerotor casing section 14 has a plurality of circumferentially arranged internal teeth 20 which are concentrically arranged relative to a longitudinally extending axis 22. An externally toothed star member 26 having at least one fewer teeth 27 than gerotor casing section 14, which may be referred to as ring member 14, has the teeth thereof in meshing engagement with the teeth 20 of ring member 14. Star member 26 partakes of a hypocycloidal movement with the geometric axis 28 thereof defining or having a circular orbital path about the axis 22 of the ring member 14. Star 26 is equal in axial length to ring member 14 and is in sealing engagement with adjacent annular surfaces of casing sections 12 and 13 between which star 26 is disposed. Star 26 has a cylindrical bore 29, and counterbores 30 and 31 on opposite sides thereof, all of which bores are concentrically disposed relative to star axis 28. Ring member 14 and star member 26, which together comprise a gerotor mechanism or gear set, may be used as the rotor and stator elements of a fluid pressure motor or pump.

Star 26 has a plurality of eight axially extending holes 32 circumferentially arranged relative to star axis 28 and located within the radial confines of star counterbores 30 and 31. Holes 32 are illustrated as haivng equal diameters although it is not an essential requirement of the invention that they have equal diameters.

Casing sections 15 and 16 have bores 33 and 34 in which bearings 35 and 36 are mounted and which are concentric relative to ring axis 22. Rotatably disposed and journalled in bearings 35 and 36 is a shaft member 37 which in this embodiment of the invention has two parts 38 and 39 to facilitate assembling the pump or motor. Shaft portions 38 and 39 are provided with collars 40 and 41, respectively, which are concentric relative to shaft axis 22 and are housed in the star counterbores 30 and 31. Star counterbores 30 and 31 orbit about axis 22 with the star 26 and the diameter of each collar 40 or 41 is thus required to be smaller than the diameter of each counterbore 30 or 31 by an amount equal to or greater than the eccentric displacement between axes 22 and 28. Shaft portion 38 has an extended portion 42 of reduced diameter which extends from collar 40 to the right into a bore 43 in shaft portion 39. Key means 44 is provided between extended shaft portion 42 and shaft portion 39 to connect the shaft portions 38 and 39 for rotation together. Shaft extension 42 is illustrated as having a diameter equal to the diameter of star bore 29 minus twice the distance between axes 22 and 28. The diameter of shaft cxtenison 42 may be somewhat smaller than illustrated, relative to star bore 29, but not larger if interference is to be avoided.

Shaft collar portions 40 and 41 are similar or identical to each other and each is provided with a set of eight holes with a set of holes 45 being provided in collar 40 and a set of holes 46 being provided in collar 41. The holes 45 and 46 extend in an axial direction and each set is arranged circumferentially relative to axis 22. All of the holes 45 and 46 have equal diameters which, in the illustrated embodiment of the invention, are also equal to the diameters of holes 32 in star 26. In addition, the collars 40 and 41 are indexed relative to each other in the assembly operation so that the holes 45 in collar 40 are in respective axial alignment with the holes 46 in collar 41. A plurality of eight cylindrically shaped rollers 50 are installed in the device with each roller 50 being disposed in a set of three holes 45, 32 and 46. The three holes 45, 32 and 46 of each set in which a roller 50 is disposed are illustrated as being of equal diameter with the holes 45 and 46 being spaced the same radial distance from axis 22 that the hole 32 is spaced from axis 28. With reference to any one set of three holes 45, 32 and 46, the roller 50 disposed therein must have a diameter which is smaller than the diameters of the holes by an amount which is equal to the eccentric displacement of axes 22 and 28. With this arrangement the star holes 32 will always be 180° out of phase relative to the collar holes 45 and 46 as best illustrated in FIG. 2 and each roller 50 will at all times have physical contact with collars 40 and 41 and star 26 during each cycle of operation. The rollers 50 provide torque transmitting connections between shaft member 37, which includes shaft portions 38 and 39, and star 26 and, with the construction illustrated, having regard to the shapes and the relative sizes of the holes 45, 32 and 36 and rollers 50, a true rolling action results between the rollers 50 and shaft member 37 and between rollers 50 and star 26.

With reference to FIG. 2, externally toothed star member 26 is disposed eccentrically in the chamber or space formed and surrounded by ring member 14 and the axis 28 of star member 26 is moveable in a circular orbital path about the axis 22 of ring member 14. During such orbital movement of star member 26 the teeth 27 thereof intermesh with the ring member teeth 20 in sealing engagement to form expanding and contracting chambers 51 between casing sections 12 and 13 which are equal in number to the number of ring member teeth 20. With further reference to FIG. 2, a vertical centerline 52 incidentally represents the line of eccentricity for the star member 26 for that particular position of the star member relative to the ring member 14. During orbital movement of the star member 26, assuming the orbital movement is clockwise, the chambers 51 on the left side of the line of eccentricity would be contracting and the chambers on the right side would be expanding. In operation a star member 26 having seven teeth will make one revolution about its own axis 28 for every seven times the star member orbits in the opposite direction about the axis 22 of the ring member 14. When the fluid pressure device is utilized as a pump, star member 26 will be orbited and rotated by a turning force applied to shaft 37 and transmitted to star member 26 through rollers 50. When the fluid pressure device is used as a motor, the force created by the orbiting and rotation of star member 26 will be transmitted through rollers 50 to shaft 37 to cause turning of shaft 37.

During the manufacturing operations the star 26 and shaft portions 38 and 39 may be arranged with fixtures or the like such that the respective axes 28 and 22 are coaxial. A plurality of cylindrically shaped holes may then be drilled through shaft flanges 40 and 41 and star 26 which are equidistance from and circumferentially arranged relative to the coaxial axes 28 and 22 to form the holes 45, 32 and 46 with a simple and economical drilling operation.

Valve casing sections 10 and 11 have axially extending bores 54 and 55 which are concentric relative to axis 22. Disposed within the confines of bores 54 and 55 on opposite sides of star 26 are circularly shaped valve disks 56 and 57 which are connected to shaft portions 38 and 39 with splining or the like so as to be rotatable therewith. Each of the valve disks has a plurality of circumferentially arranged, axially extending holes with a set of holes 58 being in disk 56 and a set of holes 59 being in disk 57. Annular channels 60 and 61 are provided respectively in casing sections 15 and 16 with annular channel 60 being in constant fluid communication with port 18 and valve holes 58 and with annular channel 61 being in constant fluid communication with port 19 and valve holes 59.

Casing sections 12 and 13 have axially extending bores to accommodate the presence of shaft portions 38 and 39. Each of the casing sections 12 and 13 has a plurality of circumferentially arranged, generally axially extending holes with a set of holes 62 being formed in casing section 12 which have fluid communication with the valve holes 58 and the gerotor chambers 51 at opposite ends thereof and a set of holes 63 being formed in casing section 13 which have fluid communication at opposite ends thereof with valve holes 59 and gerotor chambers 51.

The valving system described above, which is known in the prior art as a commutator type of valving system, will not be described in detail because it is well known in the art and it is not an essential part of the novel drive mechanism disclosed and claimed herein. In the operation of the valving system the rotation of shaft 37 and valves 56 and 57 causes the sets of valve passages 58 and 59 to be periodically in fluid communication, respectively, with the sets of casing passages 62 and 63. Assuming that port 18 is an inlet port and that port 19 is an outlet port, inlet fluid will flow in a known manner from inlet port 18 to annular channel 60 and through valve passages 58 and 62 to expanding chambers 51 formed between the teeth of the star and ring members. Outlet fluid will flow from contracting chambers formed between the teeth of the star and ring members through valve passages 63 and 59 and annular channel 61 to the outlet port 19.

While one embodiment of the invention is described here, it will be understood that it is capable of modification, and that such modification, including a reversal of parts, may be made without departure from the spirit and scope of the invention as defined in the claims.

I claim:
1. A drive mechanism comprising a first member having an axis, a second member having an axis eccentrically disposed relative to said first member axis, said second member being adapted to orbit in a circular path about said first member axis, one of said members having at least one longitudinally extending cylindrically shaped hole spaced a predetermined distance from the axis thereof, the other of said members having at least one pair of axially aligned longitudinally extending cylindrically shaped holes on opposite sides of said cylindrically shaped hole and spaced said predetermined distance from the axis thereof, a cylindrically shaped roller disposed in said holes, said holes all having equal diameters which are equal to the diameter of said roller plus the eccentric displacement of said members.

2. A drive mechanism as defined in claim 1 wherein said first member has only rotatable movement about its axis and said second member has both rotatable and orbital movement about said first member axis.

3. A drive mechanism as defined in claim 2 wherein said rotatable movement of said first member is in the opposite direction from said orbital movement of said second member.

4. A drive mechanism as defined in claim 1 wherein said pair of holes are disposed in said first member.

References Cited
UNITED STATES PATENTS

| | | | |
|---|---|---|---|
| 2,170,951 | 8/1939 | Perry | 74—804 |
| 2,475,504 | 7/1949 | Jackson | 74—804 |
| 3,160,032 | 12/1964 | Black | 74—804 |
| 3,316,814 | 5/1967 | Charlson | 91—56 |

FRED C. MATTERN, Jr., *Primary Examiner.*

W. S. RATLIFF, *Assistant Examiner.*